(12) United States Patent
Krivit

(10) Patent No.: US 11,282,354 B2
(45) Date of Patent: Mar. 22, 2022

(54) REAR-FACING HEAD-WORN VIDEO SURVEILLANCE SYSTEM

(71) Applicant: Steven B. Krivit, San Rafael, CA (US)

(72) Inventor: Steven B. Krivit, San Rafael, CA (US)

(73) Assignee: Steven B. Krivit, San Rafael, CA (US)

( * ) Notice: Subject to any disclaimer, the term of this patent is extended or adjusted under 35 U.S.C. 154(b) by 325 days.

(21) Appl. No.: 16/522,298

(22) Filed: Jul. 25, 2019

(65) Prior Publication Data

US 2020/0126380 A1 Apr. 23, 2020

Related U.S. Application Data

(60) Provisional application No. 62/746,798, filed on Oct. 17, 2018.

(51) Int. Cl.

| G08B 13/196 | (2006.01) |
|---|---|
| F16M 13/04 | (2006.01) |
| H04N 7/18 | (2006.01) |
| H04N 5/225 | (2006.01) |
| A42B 1/242 | (2021.01) |
| A42B 1/245 | (2021.01) |
| G03B 29/00 | (2021.01) |
| A42B 1/004 | (2021.01) |

(52) U.S. Cl.
CPC ........ *G08B 13/19621* (2013.01); *A42B 1/242* (2013.01); *A42B 1/245* (2013.01); *F16M 13/04* (2013.01); *H04N 5/2251* (2013.01); *H04N 5/2257* (2013.01); *H04N 7/185* (2013.01); *A42B 1/004* (2013.01); *G03B 29/00* (2013.01)

(58) Field of Classification Search
CPC .. G08B 13/19621; G03B 29/00; A42B 1/242; A42B 1/245; A42B 1/004; H04N 5/2251; H04N 5/2257; H04N 7/185; F16M 13/04
See application file for complete search history.

(56) References Cited

U.S. PATENT DOCUMENTS

| 6,614,408 | B1 | 9/2003 | Mann | |
|---|---|---|---|---|
| 6,704,044 | B1 | 3/2004 | Foster et al. | |
| 7,051,356 | B2 | 5/2006 | Weinstein | |
| 2007/0291115 | A1 | 12/2007 | Bachelder | |
| 2009/0195655 | A1 | 8/2009 | Pandey | |
| 2009/0322930 | A1* | 12/2009 | Chang | H04N 5/2256 348/340 |
| 2010/0067130 | A1* | 3/2010 | Kim | G02B 7/08 359/824 |
| 2013/0147963 | A1 | 6/2013 | Henninger, III et al. | |
| 2014/0267615 | A1* | 9/2014 | Tapia | H04N 13/239 348/46 |
| 2014/0270685 | A1 | 9/2014 | Letke | |
| 2016/0044281 | A1 | 2/2016 | Canfield | |
| 2016/0113345 | A1* | 4/2016 | Kolotov | A42B 3/042 2/422 |

(Continued)

*Primary Examiner* — Christopher R Harmon
(74) *Attorney, Agent, or Firm* — Jaffery Watson Mendonsa & Hamilton LLP

(57) ABSTRACT

An apparatus to facilitate surveillance is disclosed. The apparatus includes a head-worn article, including an opening in the rear the article, a video camera mounted inside of the article, having a lens positioned at the opening to capture video data from the rear of the article and a transceiver to wirelessly transmit the video data to a remote device and receive wireless signals from the remote device to control operation of the video camera.

8 Claims, 2 Drawing Sheets

(56) References Cited

U.S. PATENT DOCUMENTS

| | | | |
|---|---|---|---|
| 2017/0171515 A1* | 6/2017 | Pender | A42B 1/242 |
| 2018/0115686 A1 | 4/2018 | Carpenter et al. | |
| 2018/0177285 A1* | 6/2018 | MacDonald | F16M 11/041 |
| 2018/0332219 A1* | 11/2018 | Corcoran | H04N 5/23267 |
| 2019/0098953 A1* | 4/2019 | Strickland | G06K 9/00805 |
| 2019/0196304 A1* | 6/2019 | Jeske | F16M 11/041 |

* cited by examiner

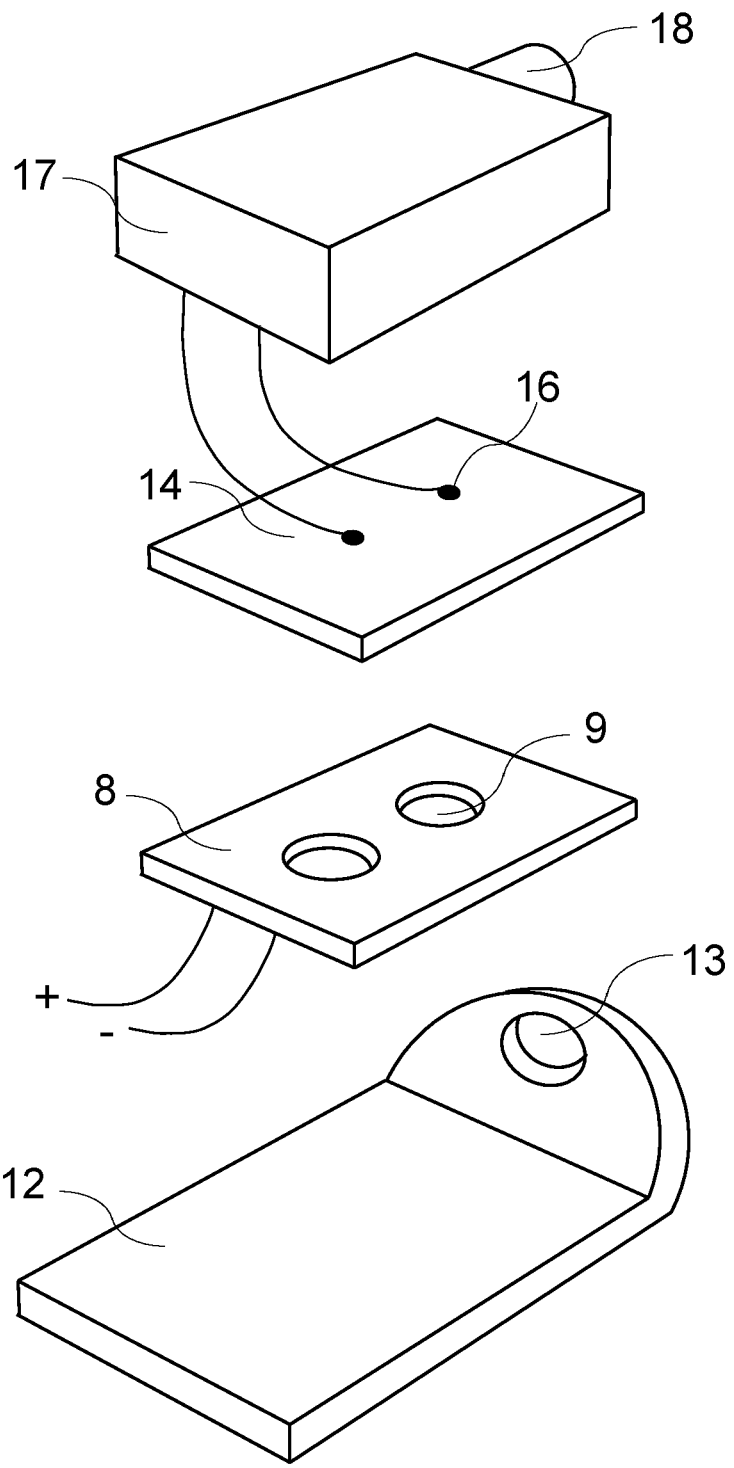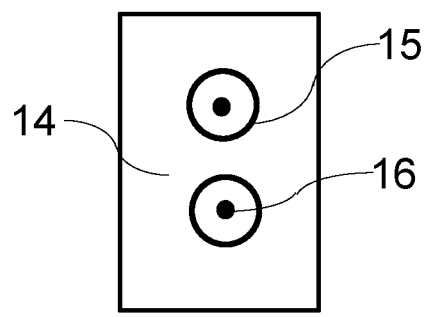

REAR-FACING HEAD-WORN VIDEO SURVEILLANCE SYSTEM

CROSS-REFERENCE

This application claims the priority of U.S. application Ser. No. 62/746,798, filed Oct. 17, 2018, the entire contents of which are hereby incorporated herein by reference.

FIELD OF INVENTION

The present invention relates generally to covert investigative surveillance devices and more specifically it relates to a head-worn item that provides an ability to perform covert video surveillance.

BACKGROUND

A variety of covert hand-held and body worn video surveillance devices have been in use for many years. These devices are intended to be used within close range of subjects under surveillance. Many such devices can be remotely controlled through a smartphone application.

Three crucial requirements facilitate successful surveillance in such circumstances, the recording device typically should 1) not be visibly obvious; 2) allow the operator to observe and track the subject; and 3) allow an operator's behavior to blend in (e.g., the operator's behavior must not appear unusual while using the device). Another requirement is that there be no unusual behavior by the operator that risks triggering a subject's natural instincts or and suspicion. Thus, the operator must be able to use the device without exhibiting behavior that might signal to the subject that the subject is the object of the operator's attention. The most common revealing behavior occurs when a surveillance operator looks at the subject they are filming. Even a split second of eye contact between the two parties can trigger suspicion in a person under surveillance and can compromise the surveillance operation.

Another revealing behavior occurs when a surveillance operator is holding any number of hand-held covert video recording devices. Some of these may be designed to look like an automobile key fob or a smartphone. If the circumstances allow the operator to place such an ordinary covert surveillance device onto a table, such as at a restaurant, the operator can easily obtain the video recording without exhibiting any potentially revealing behavior. By all appearances, the operator appears to be holding a smartphone in their hands; that is, for example, the operator appears to be browsing the Internet, or composing a text message. The operator is controlling the recording but appears to be doing nothing out of the ordinary.

However, in any situation that is more dynamic (e.g., where the operator must hold the covert video device in one hand and hold the controlling smartphone in the other hand), it becomes difficult for the operator to appear innocuous for an extended period of time because the covert video device must be held still. The operator must effectively freeze their body or, at a minimum, move slowly to avoid creating unstable video recordings that are difficult to watch and considered professionally unacceptable. Furthermore, it becomes difficult and awkward to hold and operate a smartphone with just one hand and simultaneously operate the remote control functions of the video app with the same hand.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 2 is a perspective view of a video camera/transceiver assembly.

FIG. 3 is a view of the bottom of a male contact plate.

DETAILED DESCRIPTION

Figure 1:
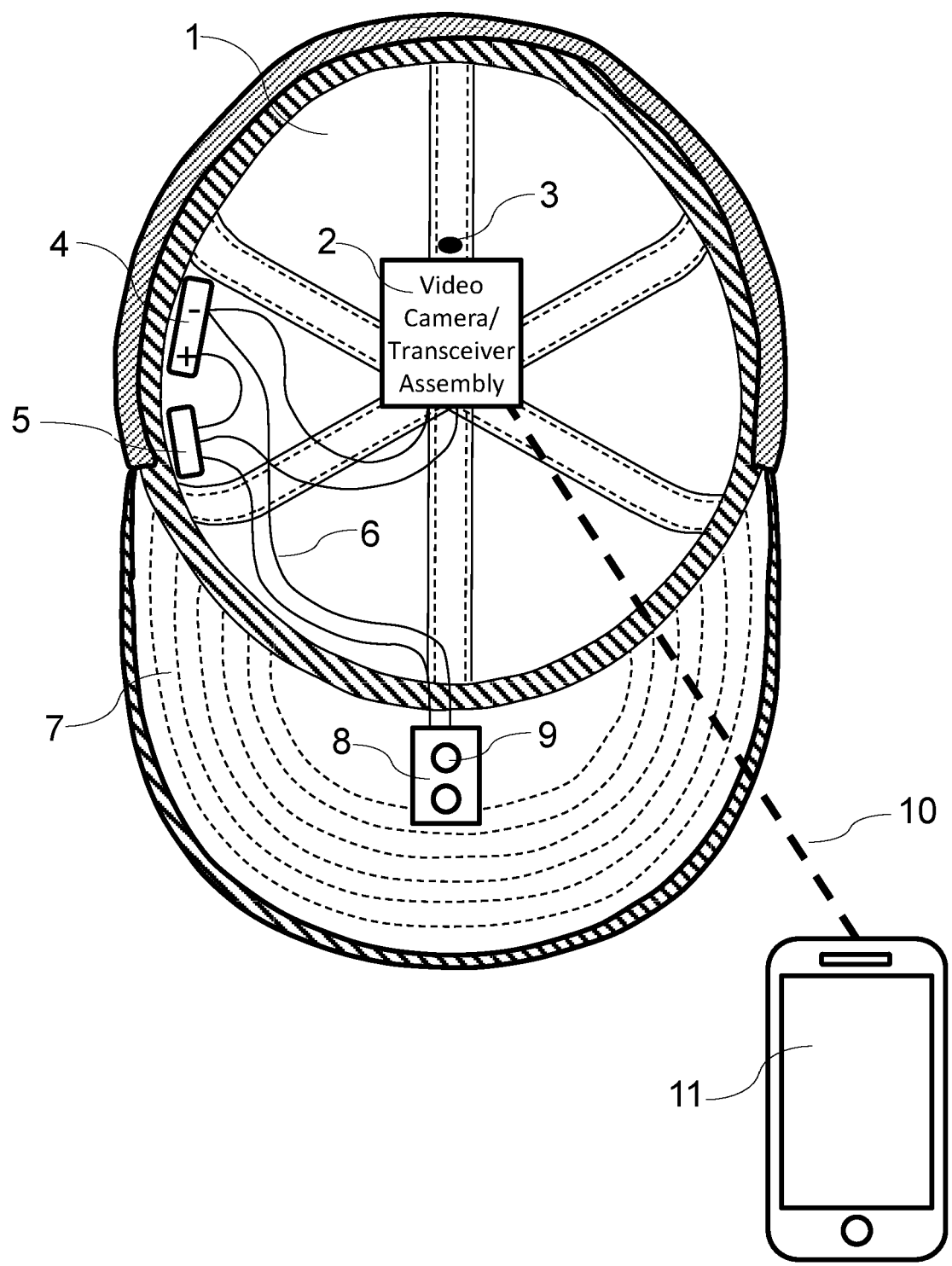
FIG. 1 illustrates one embodiment of a video surveillance system.

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Embodiments may be embodied in a rear-facing head-worn covert video surveillance system, as described below. According to one embodiment, the system provides a wirelessly controlled head-worn covert video surveillance system utilizing an article (e.g., a hat) to film behind the operator's head, and using a remote control system via a smartphone application, to enable the operator to covertly perform video surveillance. In such an embodiment, a streaming live video may be transmitted wirelessly to a smartphone and accessed via the application operating on the smartphone.

In one embodiment, the system is comprised of a device that includes a small video camera and transceiver mounted inside the top or the rear of the head-worn article. Through the use of a precise mounting bracket, the lens of the camera is aligned with an opening in the material of the head-worn article. In one embodiment the opening is of a size (e.g., 5 mm) that is sufficient to allow the capture of the full frame of a widescreen video recording.

In yet a further embodiment, a streaming live video feed transmitted to the operator's smartphone allows the operator to view images being captured by the camera and allows the operator to precisely and instantly adjust the aim of the camera hands-free by turning the head. By simply turning, tilting, or angling the head, or shifting the article on the head, the operator can precisely acquire and maintain view of the subject, and therefore acquire and maintain constant video footage of the subject, precisely and smoothly following the subject's movements.

In still a further embodiment, a hidden switch on the inside of the brim of the head-worn article can be used to discreetly start and stop power to the system to significantly prolong battery life. In this embodiment, the video camera/transceiver attaches to the head-worn article with conductive and magnetic contacts that allow immediate replacement of the electronics in the field or for transfer of electronics to a different type of head-worn article that may be better suited for a different occasion.

In conventional covert video cameras (e.g., that are designed to appear like a button, a pen, etc.) the operator is required to face in the direction of a subject under surveillance. Some of the devices provide wireless remote control. However, in order to capture video directly behind the operator, the operator must place the button or pen on an outer garment on the operator's back. The obvious problem with this arrangement is that a button or pen affixed to a person's back is going to look strange. Moreover, if the subject moves horizontally relative to the operator, the operator must rotate or his or her full body in order to maintain visual contact with and video acquisition of the subject. Further, if the subject moves vertically relative to the operator, it would require the operator to perform an unnatural body movement to bend forward or lean back to maintain visual contact with and video acquisition of the subject.

Alternatively, a design exists for a baseball cap with a hidden video surveillance camera. However the device is not designed to operate and be controlled wirelessly. A design exists for a baseball cap-based video camera with wireless controls, but the design does not embody a covert video camera. A design exists for a contact lens-based wearable system, but this obviously, does not facilitate rear-facing video acquisition.

Furthermore, the possibility of a visible wire running from a baseball cap to the operator's hands presents a risk of exposure. Moreover, such wired devices rely on small portable digital video recorders and must be hidden within a book or magazine to avoid detection, thus constraining the operator's behavior and limiting the circumstances under which such a device can be used in a rear-facing arrangement. In these respects, the present rear-facing head-worn covert video surveillance system provides an unprecedented level of discrete operation with concomitant precise operator control.

In the description, numerous specific details, such as component and system configurations, may be set forth in order to provide a more thorough understanding of the present invention. In other instances, well-known structures, circuits, and the like have not been shown in detail, to avoid unnecessarily obscuring the present invention.

FIG. 1 one embodiment of a video surveillance system 100. In one embodiment, system 100 includes a head worn article 1 (e.g., baseball hat) and a mobile device (e.g., smartphone) 11. As seen from the inside of the baseball hat 1, the rear-facing video camera/transceiver 2 is mounted inside hat 1 with the lens pointing toward an opening 3 in the rear of hat 1. In one embodiment, video camera/transceiver 2 is mounted inside at a top area of article 1. However in another embodiment, video camera/transceiver 2 is mounted inside at a rear area of article 1. In yet a further embodiment, the video camera and transceiver in article 1 may be implemented with separate components.

In one embodiment, power to the rear-facing video camera/transceiver 2 is supplied from a battery 4, controlled by a mechanical switch 5, through a wiring harness 6. In yet a further embodiment, article 1 may also include a front-facing video camera as well as the rear-facing camera. In such an embodiment, a female contact plate 8 with steel electrical contacts 9 is located at the front of article 1 to provide a location to mount a front-facing video camera/transceiver. However in other embodiments, a front facing video camera may be coupled to video camera/transceiver 2.

Video camera/transceiver 2, either rear-facing or front-facing, transmits streaming live video data (or feed) 10 wirelessly to an application running on a remote device (e.g., smartphone, tablet, etc.) 11. In a further embodiment, camera/transceiver 2 receives control signals from device 11. In such an embodiment, an application operating on device 11 may control lens aiming, starting and stopping video capture, adjusting zoom or exposure, etc.

FIG. 2 illustrates one embodiment of a video camera/transceiver assembly, such as video camera/transceiver 2. As shown in FIG. 2, a mounting bracket 12 made, for example from aluminum, is attached to the inside of the hat (or other type of headgear) and provides an opening 13 through which the lens 18 of the video camera 17 is positioned. This opening 13 in the bracket 12 is precisely aligned with the opening 3 in the rear of the hat. Thus, the lens 18 is configured to capture video images from the rear (or the side) of article 1.

In one embodiment, a female contact plate 8 is coupled to the mounting bracket 12. Two thin, recessed steel plates 9, are connected by a wiring harness 6, to a battery 4 to supply electrical power. A switch (e.g., mechanical switch) 5 is coupled to the battery 4 to control the electrical power supply to the female contact plate 8 to eventually be supplied to video camera/transceiver 17. In a further embodiment, a male contact plate 14 is coupled to the video camera/transceiver 17. Two donut-shaped permanent magnets 15 are attached to the male contact plate 14.

FIG. 3 illustrates one embodiment of a view of the bottom of the male contact plate 14. In one embodiment, spring-loaded electrical contact pins 16 are located inside the center of each permanent magnet 15 and, on making contact with the recessed steel plates 9 convey the power to the video camera/transceiver. A video camera/transceiver 17, attached to the male contact plate 14, may be magnetically coupled to the female contact plate 8 on the visor 7.

An on-off-on mechanical switch 5 directs power to the female contact plate 8 for the rear-facing video camera/transceiver or to the female contact plate 8 for a front-facing video camera/transceiver. The wireless connection 10 from the camera/transceiver to the operator's device 11 is made through the phone application associated with the camera/transceiver. In one embodiment, the battery 4 slips into a pocket in the inner lining of the head-worn article and attaches to the wiring harness 6 with a quick connector.

It is contemplated that any number and type of components may be added to and/or removed from the below discussed computing device to facilitate various embodiments including adding, removing, and/or enhancing certain features. For brevity, clarity, and ease of understanding of the computing device, many of the standard and/or known components, such as those of a computing device, are not shown or discussed here. It is contemplated that embodiments, as described herein, are not limited to any particular technology, topology, system, architecture, and/or standard and are dynamic enough to adopt and adapt to any future changes.

The above-described system enables an operator to perform video surveillance of a subject while eliminating the risk of eye contact between operator and subject. The system dramatically reduces the risk of detection during video surveillance. Unlike conventional designs, there is no need to conceal the smartphone because the operator simply appears to be a person performing normal activities such as texting, video chatting, or watching something on the Internet. As a result, the system allows for undetected video recording for much longer durations than conventional designs.

Due to reliance only on a smartphone for monitoring and control, the system allows for successful covert recording in far more varied physical circumstances than those available with conventional designs. Additionally, because the system enables easy and precise orientation of the camera as the operator turns their head, and because it enables easy operation of the control functions through the phone application, the system provides a much higher percentage of usable footage than that available using conventional designs.

In addition to providing improved concealment and enhanced covert abilities, the system provides an ability to instantly and wirelessly start and stop video recording. By having such control, the operator can limit the recording to only the time when the subject is active. Not only does this conserve recording memory, but this can minimize or entirely eliminate time required in post-production to edit out non-useful video footage.

References to "one embodiment", "an embodiment", "example embodiment", "various embodiments", etc., indicate that the embodiment(s) so described may include particular features, structures, or characteristics, but not every embodiment necessarily includes the particular features, structures, or characteristics. Further, some embodiments may have some, all, or none of the features described for other embodiments.

In the following description and claims, the term "coupled" along with its derivatives, may be used. "Coupled" is used to indicate that two or more elements cooperate or interact with each other, but they may or may not have intervening physical or electrical components between them.

As used in the claims, unless otherwise specified, the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

The drawings and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

What is claimed is:

1. An apparatus to facilitate surveillance, comprising:
   a head-worn article, including:
      an opening in the rear the article;
      a video camera mounted inside of the article, having a lens positioned at the opening to capture video data from the rear of the article;
      a transceiver to wirelessly transmit the video data to a remote device and receive wireless signals from the remote device to control operation of the video camera;
      a mounting bracket including a bracket opening aligned with the opening in the article;
      a first contact plate coupled to the mounting bracket; and
      a second contact plate coupled to the video camera and the transceiver having one or more magnets to magnetically couple to the first contact plate, wherein each of the one or more magnets comprise a contact pin to receive power from the first contact plate and convey the power to the video camera and the transceiver.

2. The apparatus of claim 1, wherein the contact pins are spring loaded.

3. The apparatus of claim 1, further comprising a switch to controls electrical power to the first contact plate.

4. The apparatus of claim 1, wherein controlling operation of the video camera comprises at least one of: aiming the lens, starting video data capture, stopping video data capture, adjusting zoom and adjusting exposure.

5. A system to facilitate surveillance, comprising:
   a remote device; and
   a head-worn article, communicatively coupled to the remote device, including:
      an opening in the rear the article;
      a video camera mounted inside of the article, having a lens positioned at the opening to capture video data from the rear of the article;
      a transceiver to wirelessly transmit the video data to the remote device and receive wireless signals from the remote device to control operation of the video camera; and
      a mounting bracket including a bracket opening aligned with the opening in the article;
      a first contact plate coupled to the mounting bracket; and
      a second contact plate coupled to the video camera and the transceiver having one or more magnets to magnetically couple to the first contact plate, wherein each of the one or more magnets comprise a contact pin to receive power from the first contact plate and convey the power to the video camera and the transceiver.

6. The system of claim 5, wherein the contact pins are spring loaded.

7. The system of claim 5, further comprising a switch to control electrical power to the first contact plate.

8. The system of claim 5, wherein controlling operation of the video camera comprises at least one of: aiming the lens, starting video data capture, stopping video data capture, adjusting zoom and adjusting exposure.

* * * * *